(12) United States Patent
Chen et al.

(10) Patent No.: US 7,752,932 B2
(45) Date of Patent: Jul. 13, 2010

(54) LINEAR ACTUATOR

(75) Inventors: Tung-Hsin Chen, Taichung (TW); Hsin-An Chiang, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 0 days.

(21) Appl. No.: 12/098,449

(22) Filed: Apr. 6, 2008

(65) Prior Publication Data

US 2009/0249905 A1   Oct. 8, 2009

(51) Int. Cl.
   *F16H 27/02* (2006.01)
(52) U.S. Cl. .................. 74/89.22; 74/89.23; 248/161
(58) Field of Classification Search ............ 74/89.2, 74/89.22, 89.23, 89.35, 89.37, 424.71; 248/157, 248/161, 274.1, 295.11, 405
   See application file for complete search history.

(56) References Cited

U.S. PATENT DOCUMENTS

| 4,217,987 | A | * | 8/1980 | Gattu et al. ............... 212/299 |
| 5,267,824 | A | * | 12/1993 | Kishi ....................... 414/718 |
| 5,820,088 | A | * | 10/1998 | Chapman .................. 248/161 |
| 6,880,416 | B2 | | 4/2005 | Koch |
| 7,364,124 | B2 | * | 4/2008 | Yuasa et al. ........... 248/125.8 |
| 7,647,659 | B2 | * | 1/2010 | Frolik et al. .............. 5/509.1 |
| 2002/0050112 | A1 | * | 5/2002 | Koch et al. .............. 52/651.07 |
| 2006/0156837 | A1 | * | 7/2006 | Stoelinga .................. 74/89.2 |
| 2007/0144281 | A1 | * | 6/2007 | Inoue et al. .............. 74/89.23 |

FOREIGN PATENT DOCUMENTS

DE   EP 0 982 018 A2 *   3/2000
EP   0982018 B1   6/2006

OTHER PUBLICATIONS

Machine Translation for EP 0 892 018 A2.*

* cited by examiner

*Primary Examiner*—Richard W Ridley
*Assistant Examiner*—Matthew A Johnson
(74) *Attorney, Agent, or Firm*—Banger Shia (57) ABSTRACT

A linear actuator is provided with an outer tube, an intermediate tube and an inner tube, and the tubes are all polygonal in cross section and are mounted orderly. The outer tube is disposed at the bottom thereof with a push device which has a screw and a nut that are screwed with each other. The nut is engaged in the intermediate tube and is linked to move axially by the screw. The intermediate tube can be movably equipped with a pulling member, and the pulling member can link the inner tube to synchronously move in the axial direction. By such arrangements, the linear actuator allows the respective tubes to extend and retract axially relative to one another while preventing them from moving relative to one another in radial direction, thus achieving the stable and smooth axial movement.

3 Claims, 9 Drawing Sheets

LINEAR ACTUATOR

BACKGROUND OF THE INVENTION

1. Field of the Invention

The present invention relates to a linear actuator, and more particularly to a transmission device, which can be radially restricted but performs a stable axial extending/retracting movement.

2. Description of the Prior Art

The existing linear actuators have a quite wide range of use and are generally driven by motors to retract and extend other mechanisms.

Figure 1:
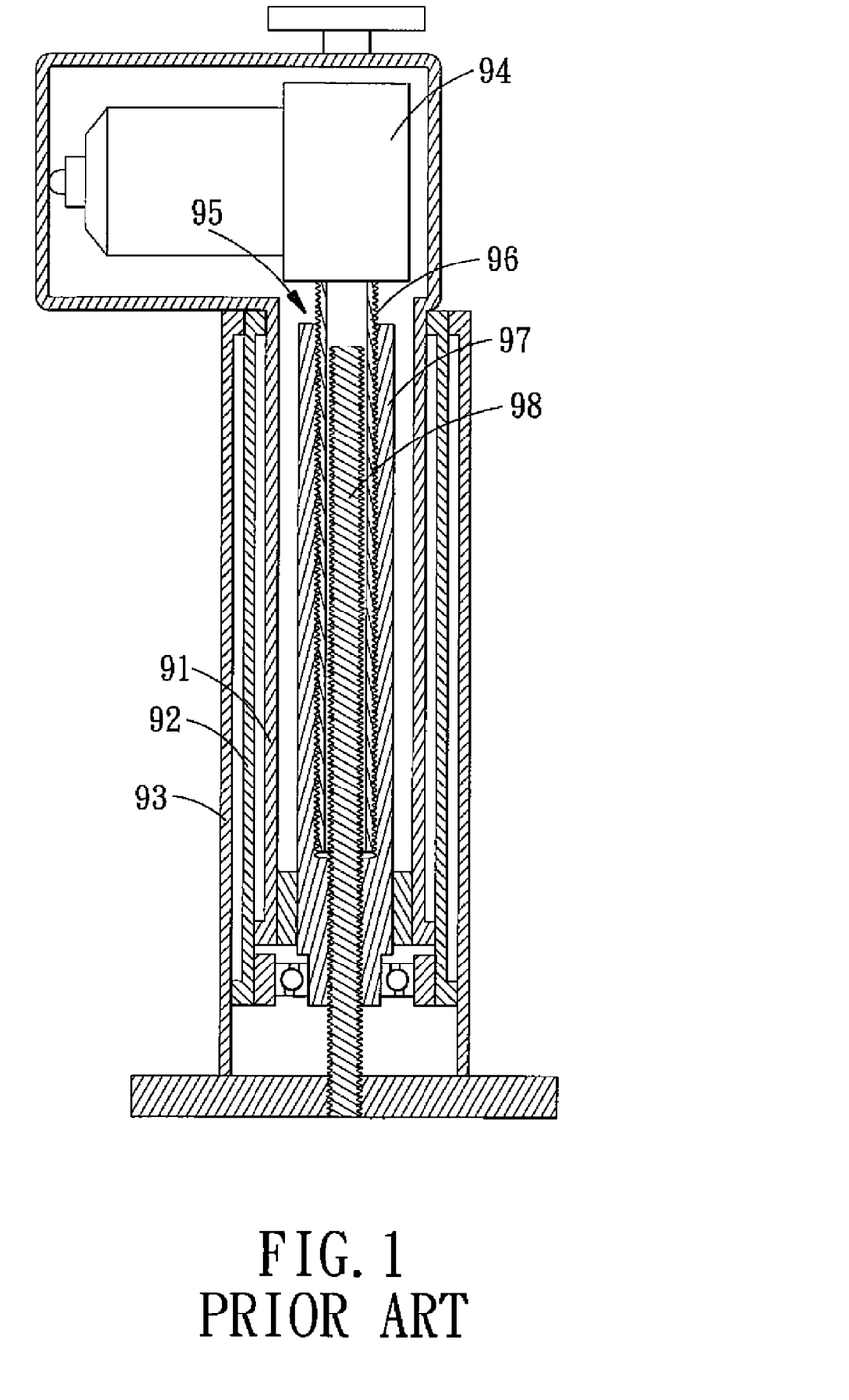
FIG. 1 is a side view of a conventional linear actuator.
Figure 2:
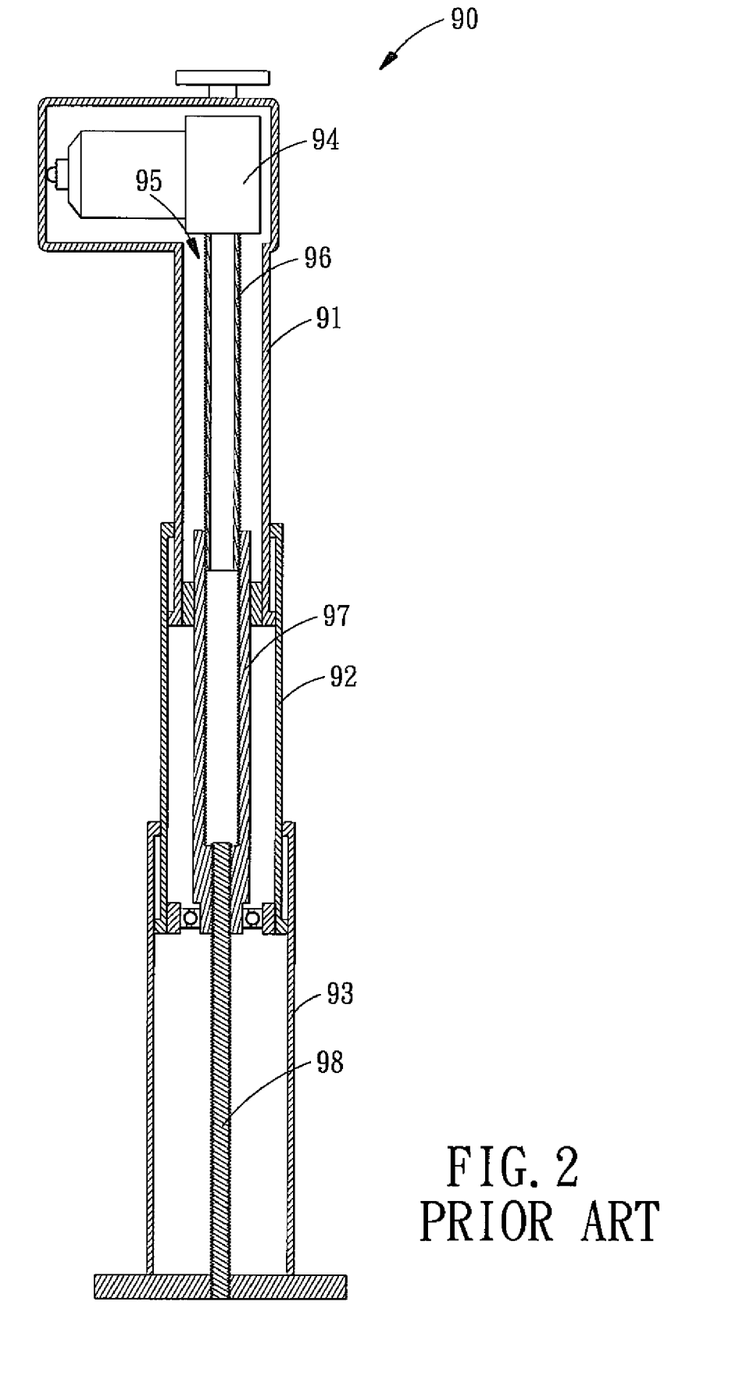
FIG. 2 is a side view showing that the conventional linear actuator is extended.

Referring to FIGS. 1-2, a conventional linear actuator 90 disclosed in U.S. Pat. No. 6,880,416 is disposed with a three-segment telescopic structure consisting of three tubes 91, 92 and 93, in which is disposed a motor 94. The motor 94 is used to drive a screw assembly 95 which is disposed with three screws 96, 97 and 98. The three screws 96, 97 and 98 are connected to the respective tubes, 91, 92 and 93 of the linear actuator 90, respectively. The motor 94 drives the three screws 96, 97 and 98 to move in the axial direction, so that the respective tubes 91, 92 and 93 can be driven to retract and extend.

The above configuration and structure can retract and extend, but it still has the following disadvantages:

1. Complicated structure and inconvenient to assemble: the three screws 96, 97 and 98 push the respective tubes 91, 92 and 93 of the linear actuator 90, respectively, the three-segment screw structure complicates the linear actuator 90 and makes its assembly inconvenient.

2. High cost: the respective tubes 91, 92 and 93 of the above linear actuator 90 are connected to three screws 96, 97 and 98, respectively, such a structure design increases the cost of manufacturing the linear actuator 90.

Figure 3:
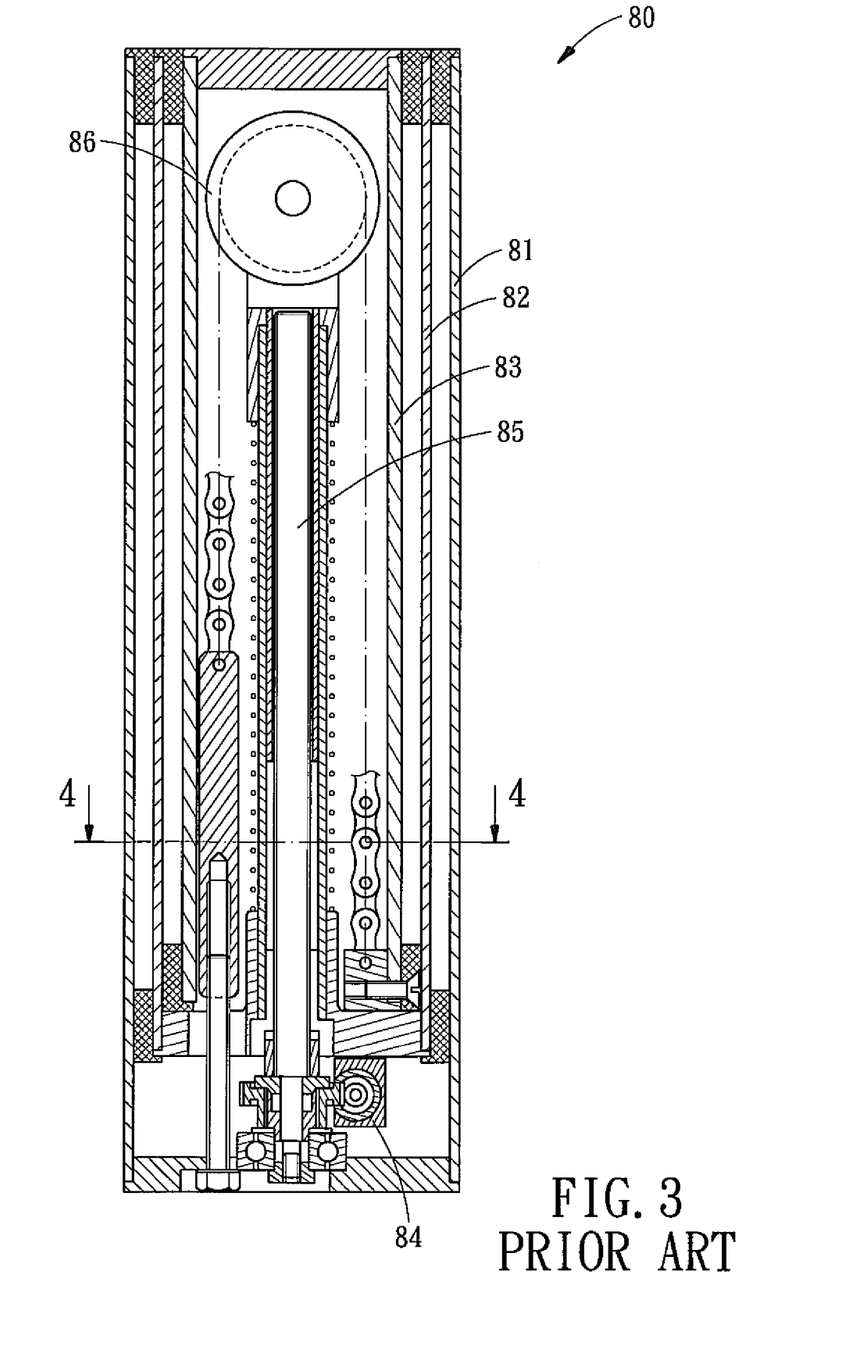
FIG. 3 is a side view of another conventional linear actuator.
Figure 4:
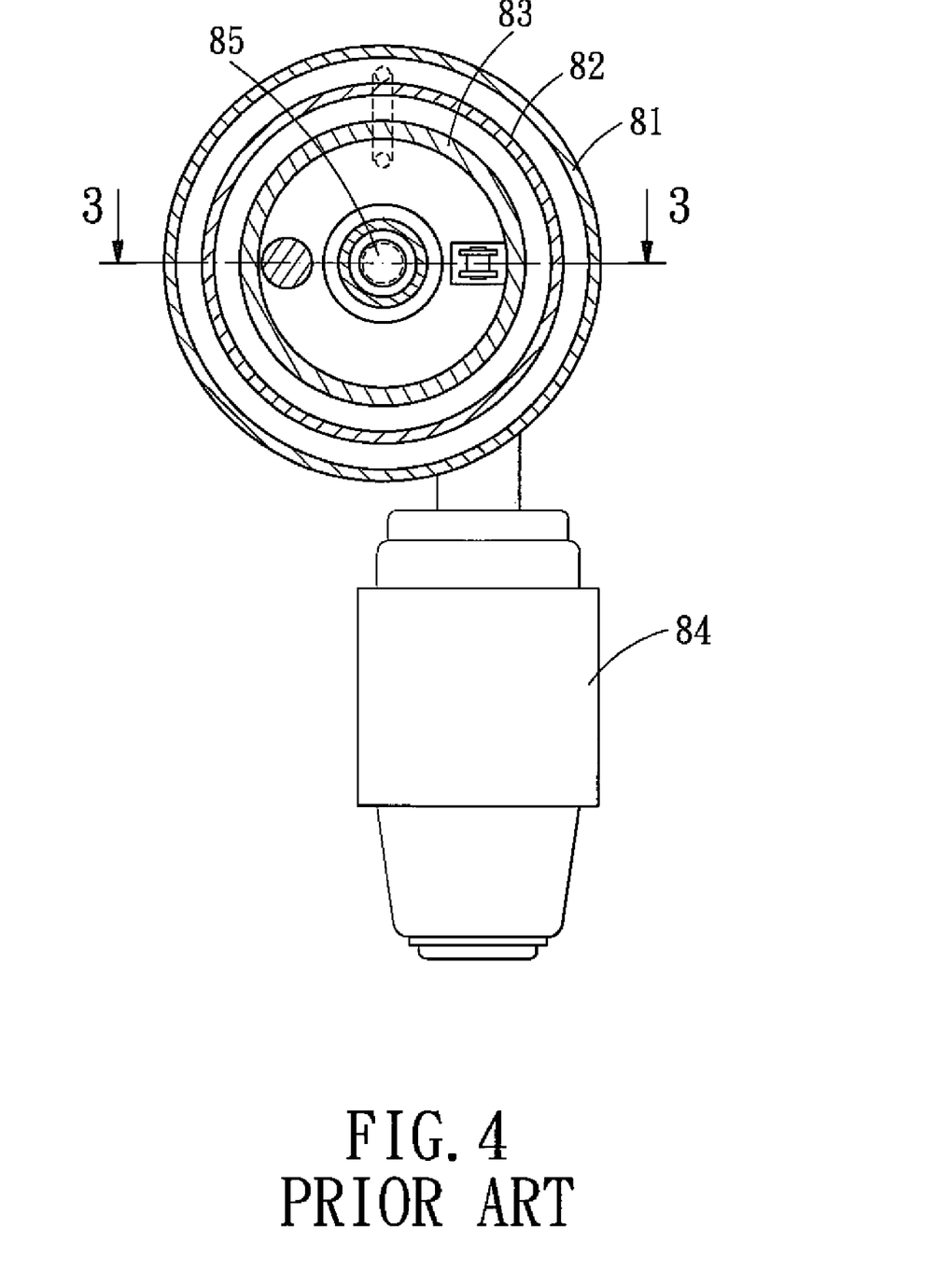
FIG. 4 is a top view of another conventional linear actuator.

Additionally, referring to FIGS. 3-4, another conventional actuator 80 disclosed in EP. Pat. No. 0982018 comprises a circular three-segment telescopic tube-shaped structure including three tubes 81, 82 and 83, in which are disposed a motor 84 and a screw 85. The motor 84 and the screw 85 are disposed in the tube 81, and the motor 84 drives the screw 85 to rotate. The screw 85 drives a brace rod due to threaded connection, and the brace rod is disposed with a pulley 86 on the top thereof, thus causing an axial displacement. The pulley 86 serves as a movable pulley to drive another tube 83 to move in the axial direction by cooperating with a chain, in such a manner that the circular three-segment telescopic structure can be driven to extend and retract.

Though the above configuration and structure is extendable and retractable, it still has the following disadvantages:

1. It is likely to cause internal damage: the three telescopic tubes 81, 82 and 83 are all designed in the form of a circular tube, the circular tube-shaped three-segment telescopic tube has no engaging restricting structure, such a design is likely to cause the damage to the inner structure due to the radial rotation and friction while the motor 84 drives the screw to rotate;

2. Linkage is likely to cause mutual interference: with the displacement of the pulley 86 at the top of the brace rod, the screw 85 utilizes the chain to drive the telescopic tube 83 to successively link with the telescopic tube 82 and so on, furthermore, between the bottom of the telescopic tube 82 and the screw 85 is disposed a restricting structure which causes the unnecessary interference during the pulling process of the restricting structure and the chain, thus affecting the complete extending/retracting operation.

The present invention has arisen to mitigate and/or obviate the afore-described disadvantages.

SUMMARY OF THE INVENTION

The primary objective of the present invention is to provide a linear actuator which comprises a polygonal outer tube provided for insertion of an intermediate tube and an inner tube. The inner tube is disposed with a push device. The push device includes a screw and a nut that are screwed with each other. The nut is fixed on the push pole and movably restricted in one end of the intermediate tube. The push pole is disposed with a pulley around which the pulling member winds. One end of the pulling member is fixed in the inner tube, and the other end of the pulling member is connected to the bottom of the outer tube. Further, the bottom of the intermediate tube is disposed with a plurality of pulleys together with a plurality of steel wires. One end of the steel wire is fixed to the inner surface of the outer tube and the other end of the steel wire is fixed to one end of the inner tube.

Since the screw drives the nut, the nut pushes the push pole to move axially. At the same time, the pulling member is driven to link the inner tube to move axially, and the steel wires link the intermediate tube and the outer tube to extend and retract partially. The polygonal tube-shaped configuration allows the respective tubes to move in the radial direction while preventing them form moving in the radial direction, so that the linear actuator can achieve the objectives: the respective tubes can extend and retract smoothly in the axial direction relative to one another without causing interference and move stably while restricting one another in the radial direction.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 5:
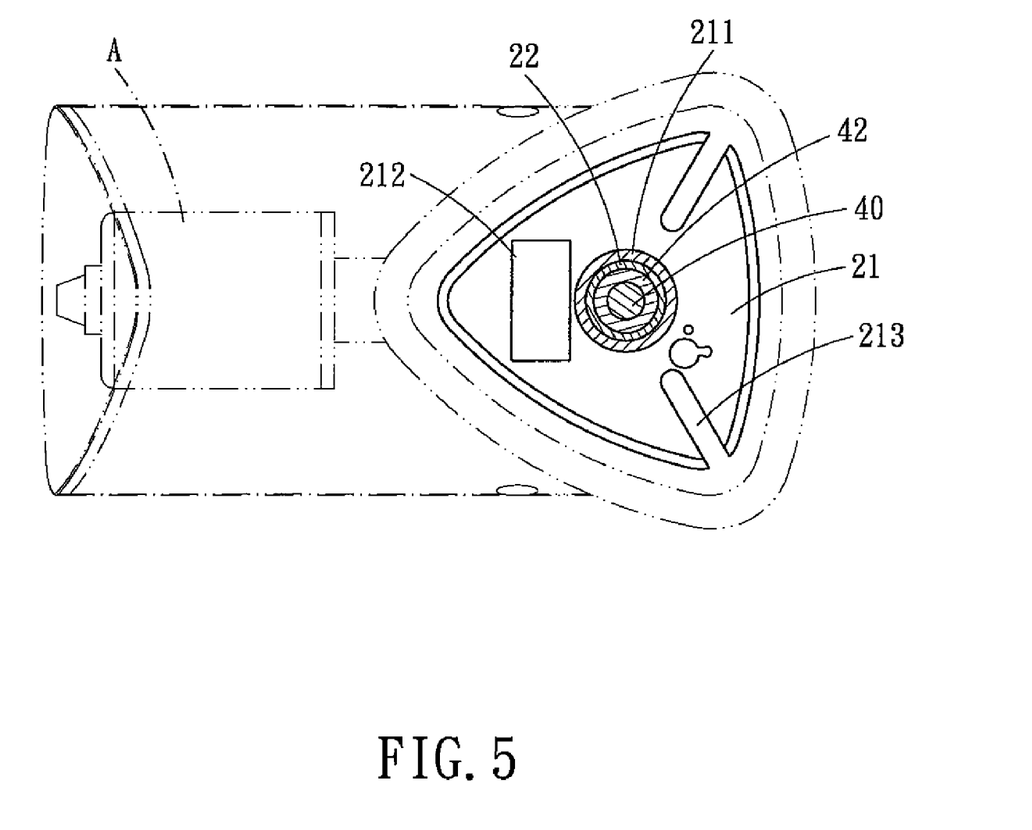
FIG. 5 is a top view of a linear actuator in accordance with the present invention.
Figure 6:
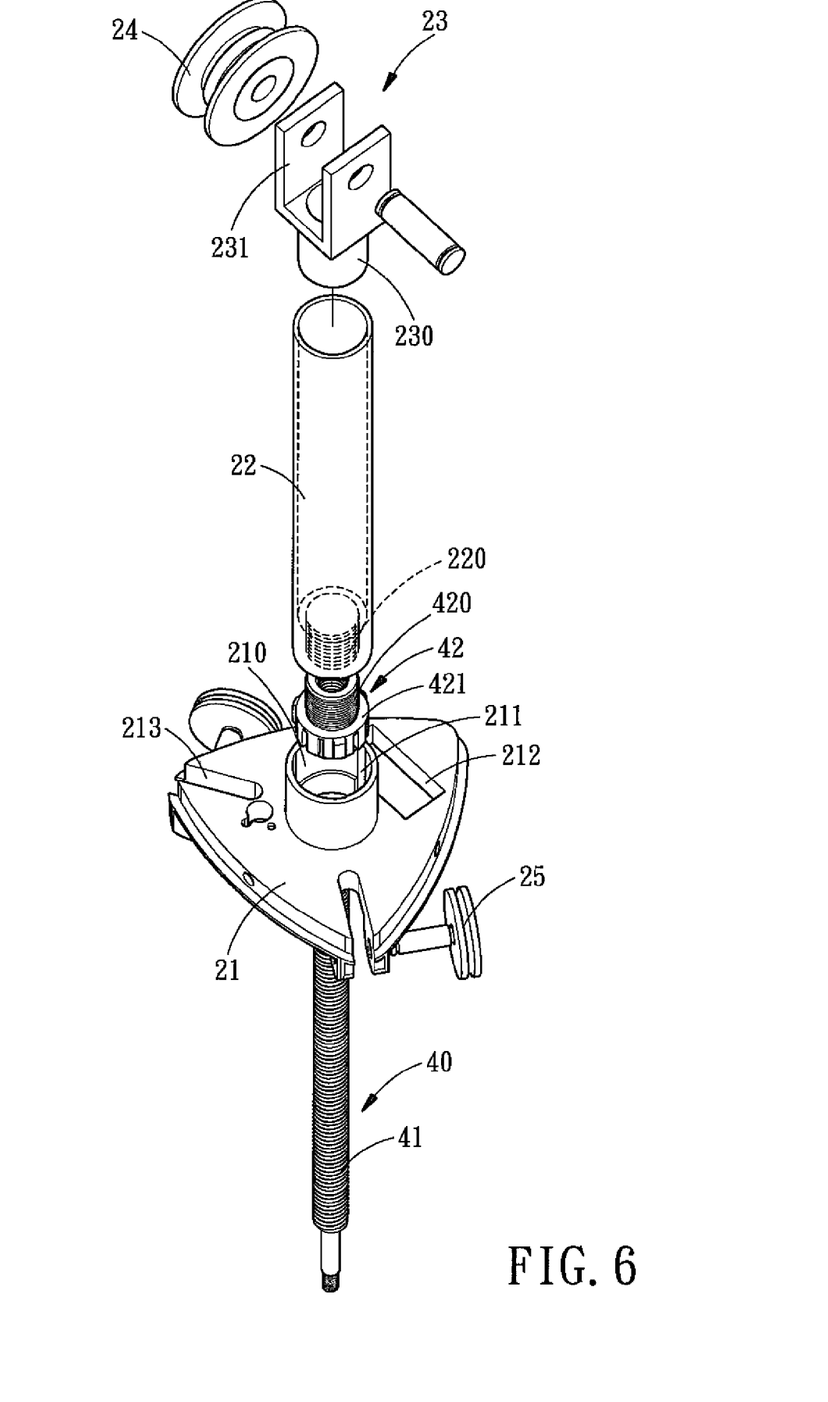
FIG. 6 is a partial perspective view of the linear actuator in accordance with the present invention.
Figure 7:
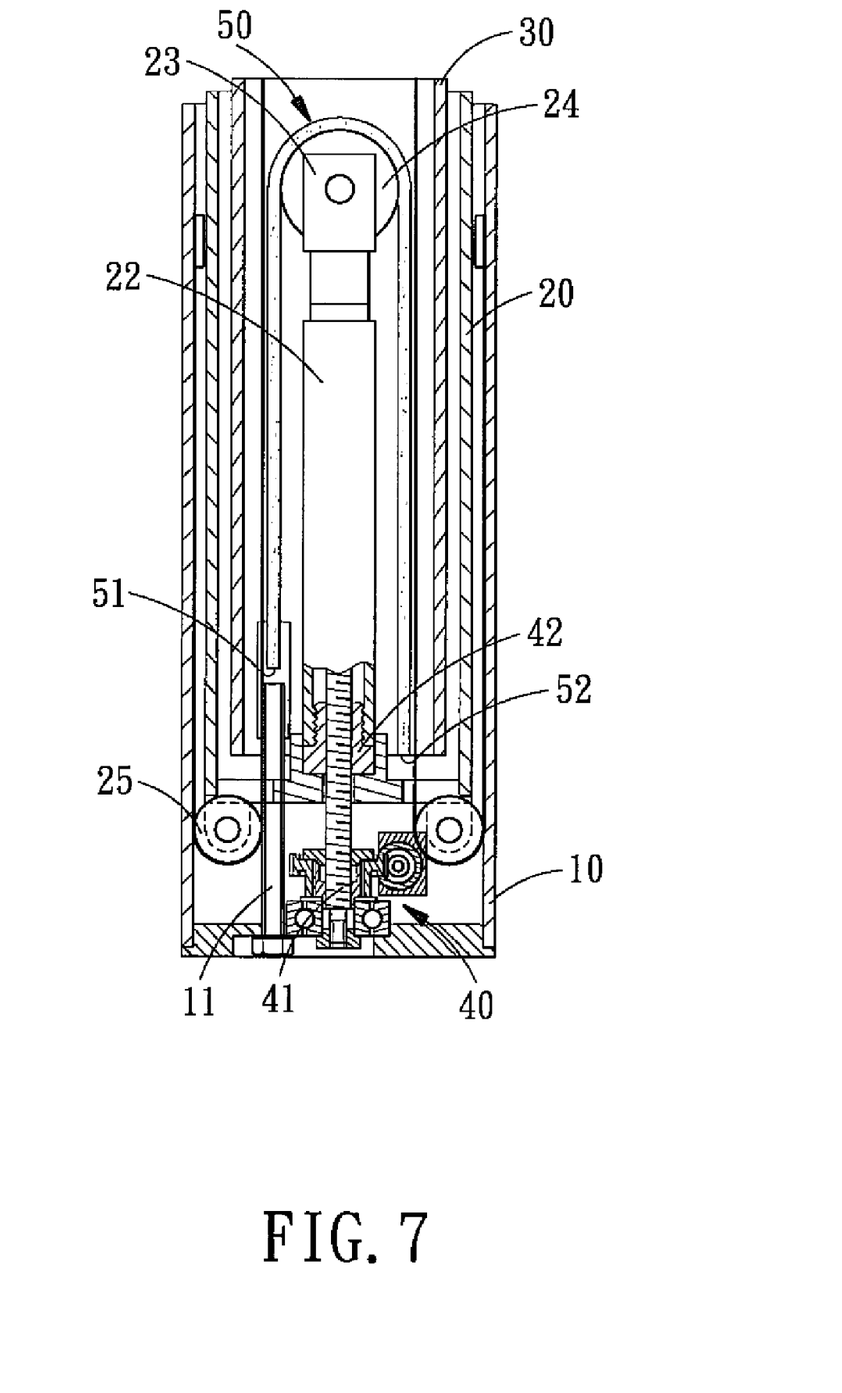
FIG. 7 is a cross sectional view shows the extending/retracting action of the linear actuator in FIGS. 5-6 in accordance with the present invention.

Referring to FIGS. 5-7, a linear actuator in accordance with the present invention comprises a polygonal outer tube 10 which is provided for the insertion of an intermediate tube 20 and an inner tube 30 that are shaped the same as the outer tube 10. The polygonal configuration allows the outer tube 10, the intermediate tube 20 and the inner tube 30 to extend and retract with respect to one other in the axial direction without moving relative to one another in the radial direction (providing a restriction function in the radial direction), thus keeping the stability of the extending/retracting movement. The respective tubes 10, 20, 30 may be in the form of a triangle, quadrangle or pentagon in cross section. The outer tube 10 is disposed at the center of the bottom thereof with a push device 40 which can drive the inner tube 30 and the intermediate tube 20 to move in the axial direction. Inside the inner tube 30 is disposed a pulling member 50. One end of the pulling member 50 is fixed to the outer tube 10, and the other end of the pulling member 50 is fixed at the bottom of inner tube 30. The middle portion of the pulling member 50 is pushed by the push device 40 to enable the other end of the pulling member 50 to pull the inner tube 30 and push the immediate tube 20 to move in the axial direction. Therefore, the linear actuator allows the respective tubes to axially extend and retract relative to one other with the least interference while preventing them from moving relative to one another in radial direction, thus keeping the stability of the extending/retracting movement.

The outer tube 10 is polygonal in cross section and is disposed with the push device 40 at the inner bottom thereof and a fixing pole 11 adjacent to the push device 40. The fixing pole 11 is provided for positioning the pulling member 50. The outer tube 10 is provided for the successive insertion of the intermediate tube 20 and the inner tube 30.

The intermediate tube 20 is polygonal in cross section and is disposed at the bottom thereof with a triangular connecting plate 21 with the same configuration as the intermediate tube 20. As shown in FIG. 6, the connecting plate 21 is centrally disposed with a receiving portion 210 in the form of a hollow cylinder. The receiving portion 210 is provided for engaging with the push device 40 and a hollow cylinder-shaped push pole 22. In the inner surface of the receiving portion 210 is equidistantly disposed a plurality of elongated guiding grooves 211 extending along the extending/retracting direction of the respective tubes. The guiding grooves 211 are provided for engaging with and restricting the push device 40. The push pole 22 is disposed with an inner threaded portion 220 in one end thereof opposite to the receiving portion 210. The inner threaded portion 220 is screwed on a corresponding member in the push device 40. The other end of the push pole 22 is disposed with a three-dimensional Y-shaped pivot body 23 which is disposed at one end thereof with a cylindrical inserting portion 230. The inserting portion 230 is inserted into one end of the push pole 22. The other end of the pivot body 23 is a U-shaped pivot portion 231 for pivoting a pulley 24, around which a pulling member 50 winds.

The connecting plate 21 is disposed in one end thereof with a rectangular hollow portion 212 for the insertion of the fixing pole 11 and the pulling member 50. Each of the other two ends of the connecting plate 21 is disposed with a slot 213. The open end of each slot 213 is pivoted with a pulley 25 which is movably equipped with a steel wire 26. One end of each steel wire 26 is fixed inside the outer tube 10, and the other end of each steel wire 26 is successively inserted through the slot 213 of the connecting plate 21 at the bottom of the intermediate tube 20 to the inside of the inner tube 30 and is fixed at the top of the inner tube 30.

The inner tube 30 is polygonal in cross section and is inserted into the intermediate tube 20. The bottom of the inner tube 30 is provided for fixing one end of the pulling member 50.

The push device 40 includes a screw 41 and a nut 42 that are screwed with each other. The screw 41 is pivoted at the bottom of the outer tube 10 and is to be driven by a motor. The nut 42 further includes an outer threaded portion 420 to be screwed with the inner threaded portion 220 of the push pole 22. After the nut 42 is screwed, it will be engaged into the receiving portion 210 of the connecting plate 21. On the outer surface of the nut 42 is equidistantly disposed with a plurality of guiding portions 421 extending along the extending/retracting direction of the respective tubes for engaging with the guiding grooves 211 of the connecting plate 21.

The pulling member 50 winds around the pulley 24 of the push pole 22 and the pulling member 50 includes a first fixed end 51 and a second fixed end 52. The first fixed end 51 is fixed at one end of the fixing pole 11, and the second fixed end 52 is fixed at the bottom of the inner tube 30.

The pulling member 50 is selected from the group consisting of a belt, a chain and a steel wire.

As shown in FIG. 7, when the motor drives the screw 41 of the push device 40 to rotate, since the guiding grooves 211 and the guiding portions 421 are the radial engaging structures of the receiving portion 210 of the connecting plate 21 and the nut 42, respectively, the nut 42 is only allowed to move axially but not radially, that is, the nut 42 is kept from rotating but moves with respect to the screw 41 in the axial direction and synchronously drives the push pole 22 and the pulley 24 to push the middle portion of the pulling member 50, causing axial retraction and extension of the inner tube 30.

Figure 8:
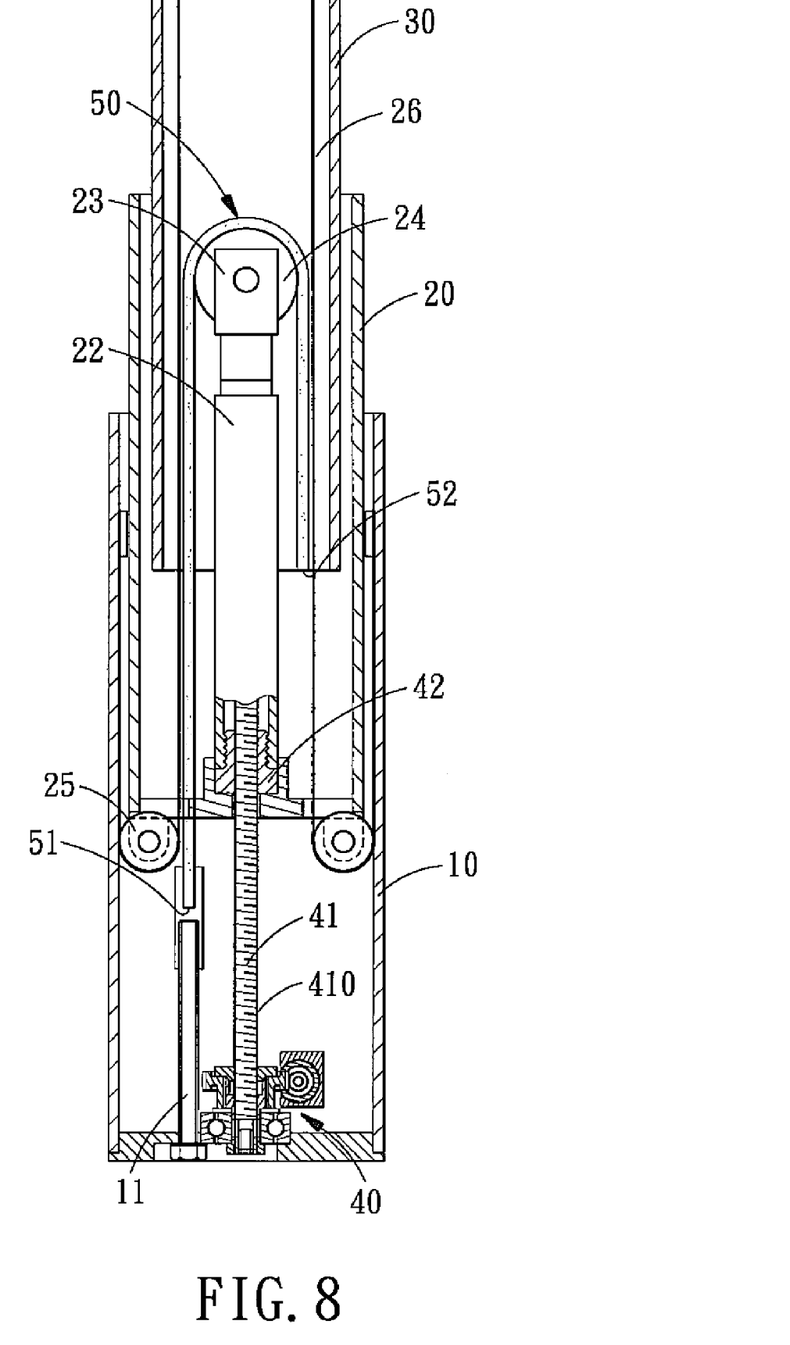
FIG. 8 is a cross sectional view showing that the extending action of the actuator in FIG. 7 in accordance with the present invention.
Figure 9:
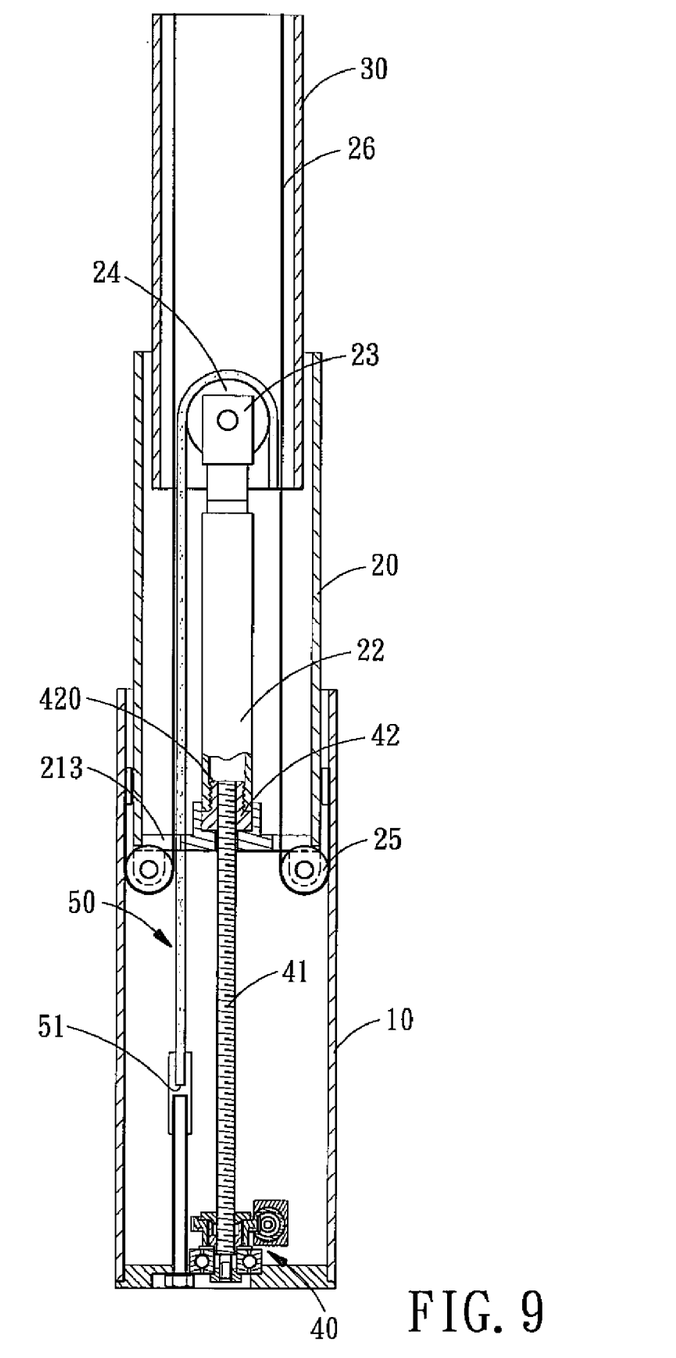
FIG. 9 is a cross sectional showing that the linear actuator in FIG. 7 is extended to the highest position in accordance with the present invention.

As shown in FIG. 8, while the inner tube 30 moves, it pulls the steel wire 26 to force the pulley 25 of the intermediate tube 20 to move, and the connecting plate 21 of the intermediate tube 20 also moves upward, at this moment, the nut 42 is still kept in the receiving portion 210 without having to move axially, thus avoiding the occurrence of interference, as shown in FIG. 9, the inner tube 30 extends to the highest position. As a result, there is no interference caused by the axial movement of the intermediate tube 20 with respect to the nut 42, and the stable and smooth axial extension and retraction can be achieved.

With the above structures, the present invention can offer the following functions, such as:

1. Stable restricting extending/retracting movement: the outer tube 10, intermediate tube 20 and the inner tube 30 are all polygonal in cross section, and the outer tube 10 is provided for the insertion of the intermediate tube 20 and the inner tube 30, by such a polygonal tube-shaped structure design, the outer tube 10, the intermediate tube 20 and the inner tube 30 can offer the function of restricting the axial extending/retracting distance;

2. Improving the smoothness of the complete extending/retracting movement: between the connecting plate 21 of the intermediate tube 20 and the push device 40 is formed an axial margin, so that the intermediate tube 20 has a certain margin with respect to the push device 40 when being pulled by the steel wire 26, thus reducing the interference during the extending/retracting movement and improving the smoothness of the extending/retracting movement, even when the steel wire 26 improperly extend or retract, the smoothness of the extending/retracting movement can be ensured;

3. High stable extending/retracting movement: the nut 42 screwed with the screw 41 is positioned in the connecting plate 21 of the intermediate tube 20 and pushes the push pole 22 to perform the axial extending/retracting movement, and the pulley 24 pivoted to the push pole 22 and the pulling member 50 cooperate with each other as a movable pulley system to make the inner tube 30 extend and retract axially, and the two pulleys 25 of the intermediate tube 20 also cooperate with steel ropes 26 to act as a movable pulley system, so that the complete extending/retracting linkage is more assured and stable, realizing the high stable extending/retracting movement;

4. High safety: with the pulling member 50 and the steel wires 26 of the two pulleys, the inner tube 30 can be prevented from dropping down to damage the intermediate tube 20 or other related structures when one of the pulling member 50 or steel wire 26 is broken, thus achieving the high safety.

While we have shown and described various embodiments in accordance with the present invention, it is clear to those skilled in the art that further embodiments may be made without departing from the scope of the present invention.

What is claimed is:

1. A linear actuator comprising:
    an outer tube being polygonal in cross section and the outer tube being fixed with a fixing pole inside thereof;
    an intermediate tube being polygonal in cross section and inserted into the outer tube, and the intermediate tube being disposed with a connecting plate at a bottom thereof, the connecting plate being disposed with a receiving portion for an insertion of a hollow push pole, a top end of the push pole is provided with a pivotally mounted pulley;
    an inner tube being a polygonal tube and being inserted into the intermediate tube;
    a push device including a screw and a nut that are screwed with each other, one end of the screw being pivotally mounted to a bottom of the outer tube, and the nut being fixed to a bottom of the push pole, an exterior of the nut being restricted in the receiving portion of the connecting plate of the intermediate tube, the receiving portion and the nut being disposed with corresponding radial engaging structures, respectively; and
    a pulling member winding around the pulley of the push pole, and one end of the pulling member being fixed to the fixing pole of the outer tube, and another end of the pulling member being fixed to an end of the inner tube;
    wherein the push pole of the intermediate tube includes an inner threaded portion disposed at the bottom end, the inner threaded portion is screwed with an outer threaded portion of the nut of the push device, the top end of the push pole is provided for an insertion of a pivot body, the other end of the pivot body being provided with the pivotally mounted pulley of the push pole around which the pulling member winds;
    the connecting plate is disposed in one end thereof with a hollow portion, the hollow portion is provided for insertion of the fixing pole of the outer tube and the pulling member, the connecting plate having two other ends disposed with a slot, an open end of each slot is provided with a pivotally mounted pulley around which a steel rope winds, one end of the steel rope is fixed to an inner side of the outer tube, and the other end of the steel rope is inserted through the intermediate tube to a top of the inner tube and is fixed at the top of the inner tube.

2. The linear actuator as claimed in claim 1, wherein the pulling member is selected from the group consisting of a belt, a chain and a steel rope.

3. The linear actuator as claimed in claim 1, wherein the outer tube, the intermediate tube and the inner tube are triangular in cross section.

* * * * *